United States Patent
Vladan et al.

(10) Patent No.: US 8,872,579 B2
(45) Date of Patent: Oct. 28, 2014

(54) METHOD AND APPARATUS FOR CURRENT SENSING IN POWER OVER ETHERNET (POE) SYSTEMS

(71) Applicant: Broadcom Corporation, Irvine, CA (US)

(72) Inventors: Marius Vladan, Oudenaarde (BE); Sesha Panguluri, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 143 days.

(21) Appl. No.: 13/658,769

(22) Filed: Oct. 23, 2012

(65) Prior Publication Data
US 2014/0111180 A1    Apr. 24, 2014

(51) Int. Cl.
G05F 1/10    (2006.01)
G05F 3/02    (2006.01)

(52) U.S. Cl.
USPC .......................................... 327/543; 327/538

(58) Field of Classification Search
USPC .................................................. 327/538, 543
See application file for complete search history.

(56) References Cited

U.S. PATENT DOCUMENTS 6,323,724 B1 *   11/2001  Uekubo ......................... 327/538
7,586,364 B2 *    9/2009  Fujita et al. ................... 327/538

* cited by examiner

Primary Examiner — Hai L Nguyen
(74) Attorney, Agent, or Firm — McDermott Will & Emery LLP

(57) ABSTRACT

Systems and methods are provided for power control. In some implementations, a power control system includes a first transistor having a drain coupled to a first conductor (e.g., first pair of wires of an Ethernet cable), a second transistor having a drain coupled to a second conductor (e.g., second pair of wires of the Ethernet cable), a current sensor coupled to sources of the first and second transistors, and a current management circuit. The current management circuit may detect drain voltages of the first transistor and the second transistor, and adjust gate voltages of the first transistor and the second transistor to keep the drain voltages of the first transistor and the second transistor approximately equal. The current management circuit may detect a current through the current sensor, and adjust the gate voltages of the first transistor and the second transistor to limit the detected current to a current limit.

21 Claims, 6 Drawing Sheets

METHOD AND APPARATUS FOR CURRENT SENSING IN POWER OVER ETHERNET (POE) SYSTEMS

TECHNICAL FIELD

The present description relates generally to current sensing, and more particularly, to current sensing in power over Ethernet (PoE) systems.

BACKGROUND

Power over Ethernet (PoE) allows an electronic device (e.g., VoIP telephone, wireless access point, etc.) to receive power, along with data, over an Ethernet cable. In a PoE system, power sourcing equipment (PSE) delivers power to a powered device (PD) over an Ethernet cable.

In a PoE system, it is important to monitor and limit the current flow through the Ethernet cable. For example, the current may be limited to prevent excessive current flow through the Ethernet cable, which can cause overheating in the cable and damage the cable. In another example, the current may be limited to prevent the power to the PD from exceeding a maximum power.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

Figure 1:
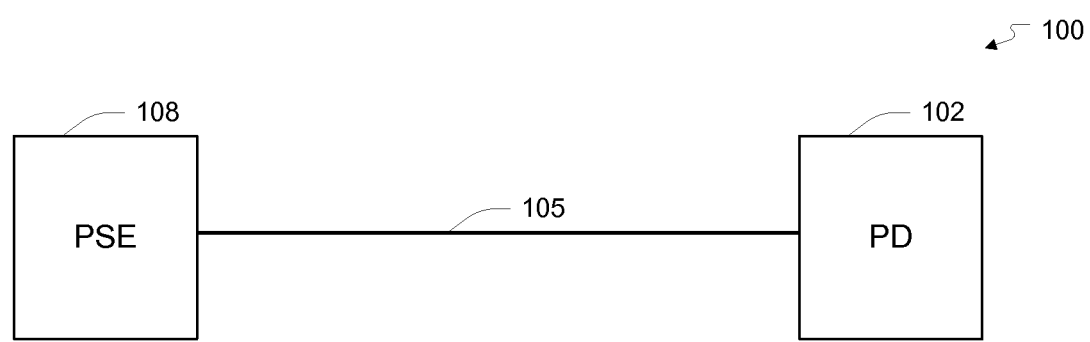
FIG. 1 illustrates an example of a PoE system.

FIG. 1 illustrates an example of a PoE system 100 including a PSE 108, a PD 102, and an Ethernet cable 105 coupling the PSE 108 to the PD 102. The PSE 108 may be part of an Ethernet switch (not shown), and configured to deliver power to the PD 102 over the Ethernet cable 105. The PD 102 may be a voice over Internet (VoIP) device, a wireless local area network (LAN) access point, a network camera, a computer, or other device capable of receiving power over the Ethernet cable 105. When the PSE 108 is part of an Ethernet switch, the Ethernet switch may communicate data with the PD 102 over the Ethernet cable 105. The Ethernet switch may connect the PD 102 to a network (e.g., the Internet or a LAN). Alternatively, the PSE 108 may be a midspan device coupled between an Ethernet switch and the PD 102, and configured to inject power into the Ethernet cable 105 to provide power to the PD 102.

Figure 2:
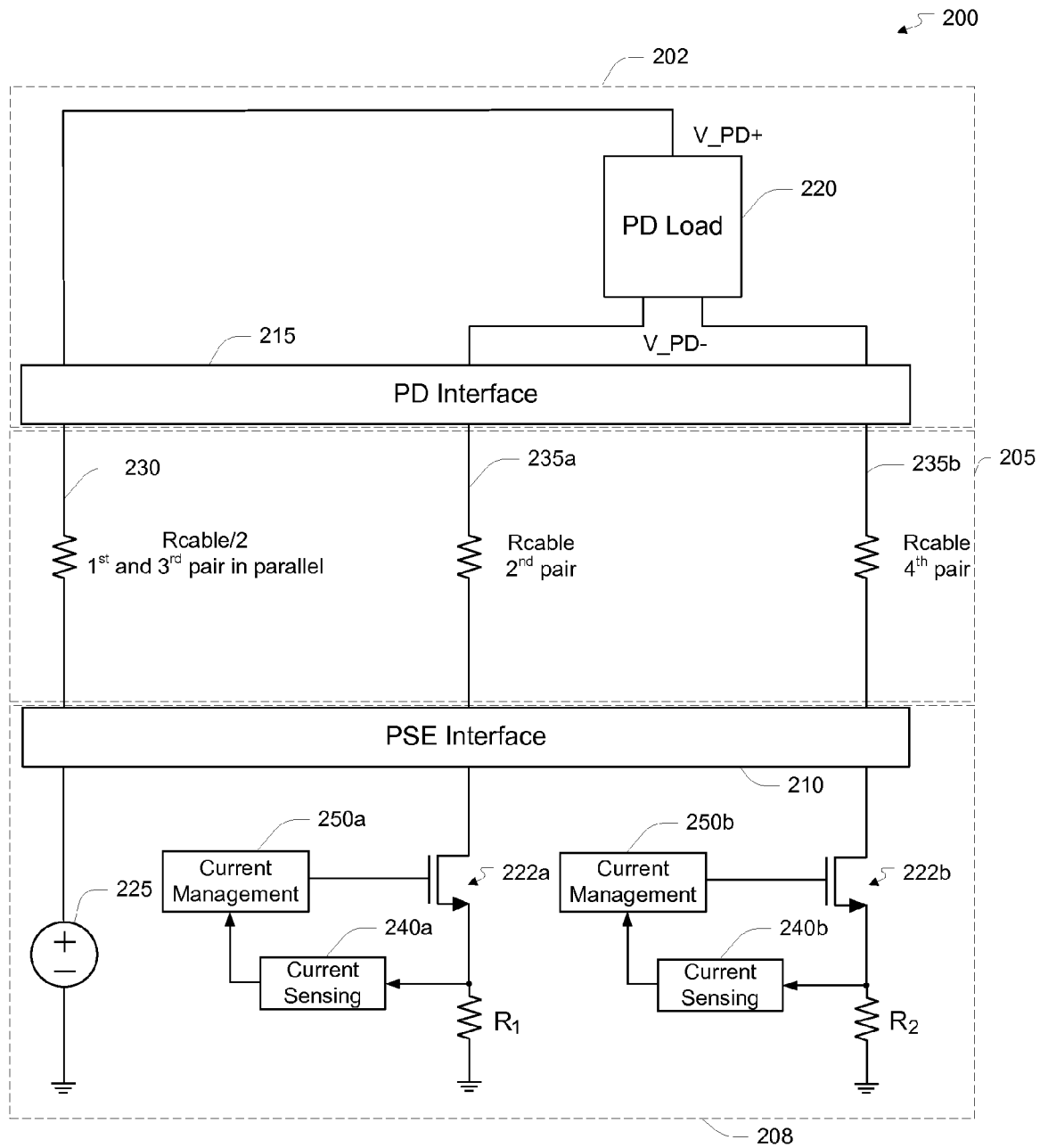
FIG. 2 illustrates an example of a PoE system that includes two current-sensing resistors.

FIG. 2 illustrates an example of a PoE system 200 with current sensing to monitor and limit the flow of current through an Ethernet cable 205. The Ethernet cable 205 includes 4 wire pairs coupled between a PSE 208 and a PD 202. In FIG. 2, first and third wire pairs of the Ethernet cable 205 are in parallel, which are depicted as a single line 230 for ease of illustration. The resistance of each wire pair is approximately Rcable (e.g., 12.5Ω). Since the first and third wire pairs are in parallel, their resistance is approximately Rcable/2, as indicated in FIG. 2. Any of the wire pairs may include a pair of wires of the Ethernet cable 205.

The PSE 208 includes a PSE interface 210, a power source 225, two field-effect transistors (FETs) 222a and 222b, two current-sensing resistors $R_1$ and $R_2$, two current sensing circuits 240a and 240b, and two current management circuits 250a and 250b. The PD 202 includes a PD interface 215, and a PD load 220 that receives power from the PSE 208 over the Ethernet cable 205.

The power source 225 is coupled to the first and third wire pairs 230 via the PSE interface 210, and the positive terminal of the PD load 220 is coupled to the first and third wire pairs 230 via the PD interface 215. The power source 225 may have a voltage, for example, of between 50 V and 57 V for the IEEE 802.3at standard. The PD load 220 receives power from the power source 225 over the first and third wire pairs 230, through which current flows from the power source 225 to the positive terminal of the PD load 220. The voltage at the positive terminal of the PD load 220 is V_PD+, which is slightly lower than the voltage of the power source 225 due to a voltage drop across the first and third wire pairs 230.

The negative terminal of the PD load 220 is coupled to second and fourth wire pairs 235a and 235b of the Ethernet cable 205 via the PD interface 215, and has a voltage of V_PD−. The second and fourth wire pairs 235a and 235b form return paths from the negative terminal of the PD load 220 to the PSE 208, through which current flows from the negative terminal of the PD load 220 to the PSE 208.

At the PSE 208, the current from the second wire pair 235a flows through FET 222a and current-sensing resistor $R_1$, producing a voltage drop across current-sensing resistor $R_1$ that is proportional to the current level of the second wire pair 235a. The voltage drop is input to current sensing circuit 240a. Current sensing circuit 240a may perform analog-to-digital conversion on the voltage drop to generate a digital signal indicating the current level of the second wire pair 235a, and output the digital signal to current management circuit 250a. Current management circuit 250a may perform one or more current management functions based on the current level indicated by the digital signal.

In some implementations, current management circuit 250a may compare the current level of the second wire pair 235a, as indicated by the digital signal, with a first current threshold $I_{CUT}$ (e.g., 600 mA). When the current level exceeds the first current threshold $I_{CUT}$ for a certain time period (e.g., 50 ms), current management circuit 250a may turn off FET 222a (e.g., by pulling the gate of FET 222a to ground) to shut off current flow through the second wire pair 235a. This may be done to prevent the second wire pair 235a from overheating.

Current sensing circuit 240a may also pass the voltage drop across current-sensing resistor $R_1$ directly to current management circuit 250a. Current management circuit 250a may control the gate voltage of FET 222a based on the voltage drop to limit the current flow though the second wire pair 235a to a second current threshold $I_{LIM}$ (e.g., 700 mA), which is higher than the first current threshold $I_{CUT}$. The second current threshold $I_{LIM}$ may be referred to as a current limit threshold.

In some implementations, current management circuit 250a may compare the current level, as indicated by the voltage drop across current-sensing resistor $R_1$, with the second current threshold $I_{LIM}$. When the current level exceeds the second current threshold $I_{LIM}$, current management circuit 250a may reduce the gate voltage of FET 222a to reduce the current flow through FET 222a and, hence the second wire pair 235a, until the current level falls down to the second current threshold $I_{LIM}$. This may be done to limit the current flow through the second wire pair 235a to a maximum current.

FET 222b, current-sensing resistor $R_2$, current sensing circuit 240b, and current management circuit 250b may monitor and limit the current flow through the fourth wire pair 235b in a similar manner as described above for the second wire pair 235a.

Therefore, the PSE 208 in FIG. 2 uses two current-sensing resistors to monitor the current flows through the second and fourth wire pairs 235a and 235b of the Ethernet cable 205. However, the two current-sensing resistors take up valuable real estate in a system (e.g., Ethernet switch) that incorporates the PSE 208. For a system (e.g., Ethernet switch) with 48 ports (one port for each Ethernet cable), this translates into 96 current-sensing resistors, increasing the size and cost of the system. Accordingly, it is desirable to reduce the number of current-sensing resistors.

Figure 3:
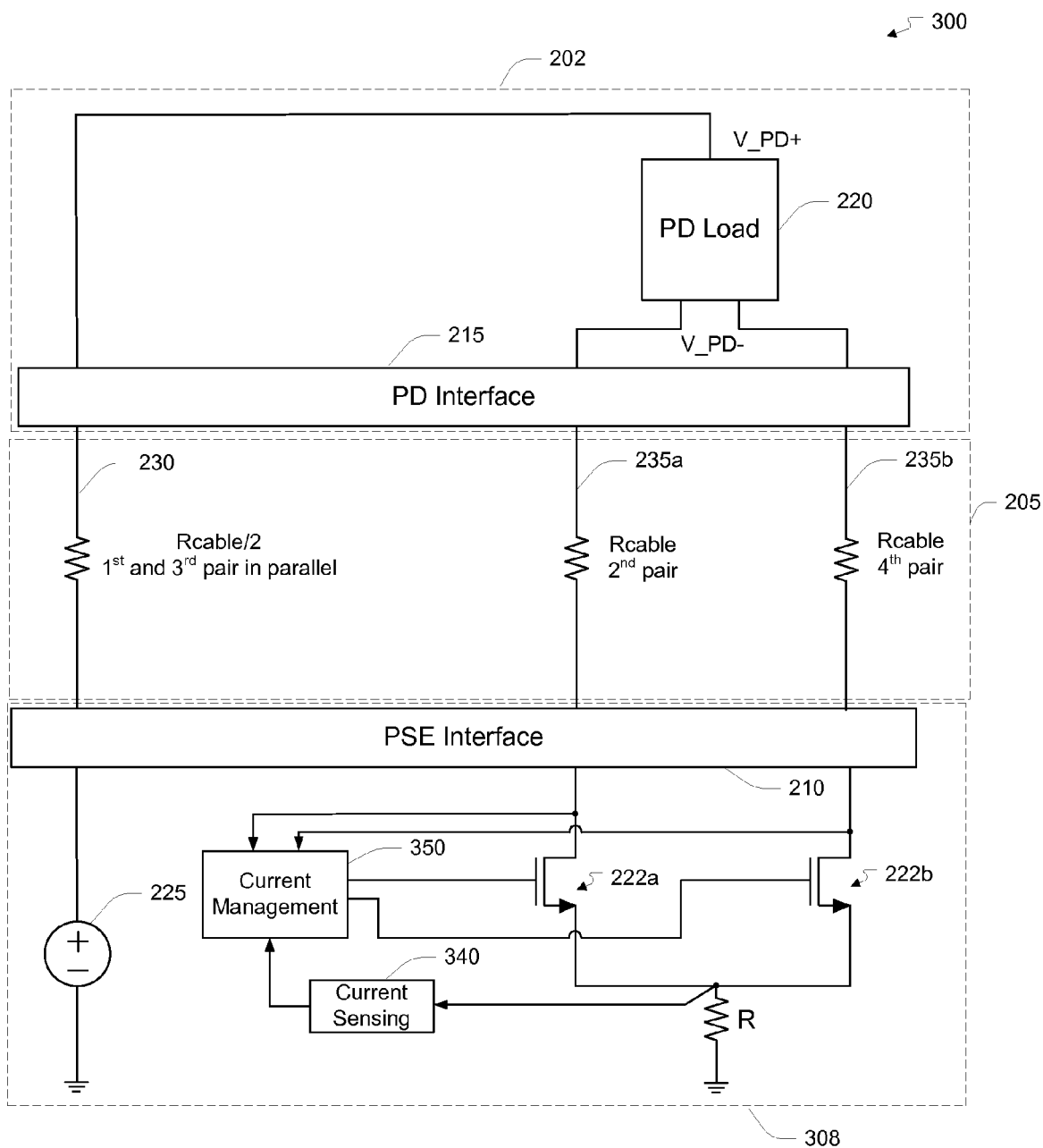
FIG. 3 illustrates an example PoE system including a current-sensing resistor that is shared by two transistors according to some aspects of the subject technology.

FIG. 3 illustrates an example PoE system 300 that includes a PSE 308 according to some aspects of the subject technology. The PSE 308 includes a single current-sensing resistor R that is shared by FET 222a and FET 222b. The current-sensing resistor R is coupled to the sources of FET 222a and FET 222b so that the currents flowing through FET 222a and FET 222b flow into the current-sensing resistor R. Thus, the voltage drop across the current-sensing resistor R is proportional to the combined current flowing through FET 222a and FET 222b, and therefore provides a measurement of the combined current flowing through the second and fourth wire pairs 235a and 235b.

The voltages at the drain of FET 222a and the drain of FET 222b are input to a current management circuit 350. This allows the current management circuit 350 to monitor the drain voltages of FET 222a and FET 222b. The current management circuit 250 may independently adjust the gate voltages of FET 222a and FET 222b to keep the monitored drain voltages of FET 222a and FET 222b approximately equal to each other. Since the sources of FET 222a and FET 222b are coupled together, this maintains approximately equal drain-to-source voltages across FET 222a and FET 222b.

The voltage drop across the second wire pair 235a is V_PD− minus the drain voltage of FET 222a and the voltage drop across the fourth wire pair 235b is V_PD− minus the drain voltage of FET 222b. Because the drain voltages of FET 222a and FET 222b are approximately equal, the voltage drops across the second and fourth wire pairs 235a and 235b are approximately equal. Since the second and fourth wire pairs 235a and 235b have approximately equal voltage drops and resistances, the currents flowing through the second and fourth wire pairs 235a and 235b are approximately equal. Thus, by maintaining approximately equal drain voltages for FET 222a and FET 222b, the current management circuit 350 maintains approximately equal current flows though the second and fourth wire pairs 235a and 235b.

The voltage drop across the current-sensing resistor R is input to the current sensing circuit 340. The current sensing circuit 340 may perform analog-to-digital conversion on the voltage drop to generate a digital signal indicating the combined current level of the second and fourth wire pairs 235a and 235b, and output the digital signal to the current management circuit 350. The current management circuit 350 may perform one or more current management functions based on the digital signal.

In some implementations, the current management circuit 350 may compare the combined current level, as indicated by the digital signal, with a first current threshold $I_{CUT}$ (e.g., 1200 mA). When the combined current level exceeds the first current threshold $I_{CUT}$ for a certain time period (e.g., 50 ms), the current management circuit 350 may turn off FET 222a and FET 222b (e.g., by pulling the gates of FET 222a and FET 222b to ground) to shut off current flow through the second and fourth wire pairs 235a and 235b. The first current threshold $I_{CUT}$ used in the PSE 308 in FIG. 3 may be twice the first current threshold $I_{CUT}$ used in the PSE 208 in FIG. 2. This is because the current management circuit 350 compares the first current threshold $I_{CUT}$ with the combined current level of the second and fourth wire pairs 235a and 235b, instead of the current level of just one of the wire pairs.

Because the current flow through each of the second and fourth wire pairs 235a and 235b is approximately equal, excessive current flow through one of the second and fourth wire pairs 235a and 235b is prevented. Without current balancing, it is possible for an excessive amount of current to flow through one of the second and fourth wire pairs 235a and 235b and a small amount of current to flow through the other one of the second and fourth wire pairs 235a and 235b. In this case, the combined current flow may be below the first current threshold $I_{CUT}$ even though the current flow through one of the wire pairs is well above the individual current limit for that wire pair. The current balancing, which is provided by keeping the drain voltages of FET 222a and FET 222b approximately equal, prevents this from happening.

The current sensing circuit 340 may also pass the voltage drop across the current-sensing resistor R directly to the current management circuit 350. The current management circuit 350 may control the gate voltages of FET 222a and FET 222b based on the voltage drop to limit the combined current level of the second and fourth wire pairs 235a and 235b to a second current threshold $I_{LIM}$ (e.g., 1400 mA).

In some implementations, the current management circuit 350 may compare the combined current level, as indicated by the voltage drop across current-sensing resistor R, with the second current threshold $I_{LIM}$. When the combined current level exceeds the second current threshold $I_{LIM}$, the current management circuit 350 may reduce the gate voltages of FET 222a and FET 222b to reduce the combined current level until the combined current level falls to the second current threshold $I_{LIM}$.

Thus, the current management circuit 350 may control the gate voltages of FET 222a and FET 222b to maintain equal drain voltages for FET 222a and FET 222b for current balancing, and to limit the combined current level of the second and fourth wire pairs 235a and 235b to the second current threshold $I_{LIM}$.

Therefore, the PSE 308 may use one current-sensing resistor to monitor the current flow through two wire pairs instead of two current-sensing resistors. In addition, the PSE 308 may use only one analog-to-digital (ADC) channel for current monitoring. This is because a voltage drop across one current-sensing resistor is digitized instead of two voltage drops across two current-sensing resistors. As a result, the number of components in a system (e.g., Ethernet switch) incorporating the PSE 308 can be reduced. For a system with 48 ports (one port for each Ethernet cable), this means that 48 fewer current-sensing resistors are needed compared with the PSE 208 in FIG. 2.

Although aspects of the subject technology are described above using the example of a current-sensing resistor to measure the combined current flow through two wire pairs, it is to be appreciated that the subject technology is not limited to this example, and that other types of current sensors may be used. For example, a Hall-effect current sensor may be used to measure the combined current flow. In this example, a conductor may be coupled to the sources of FET 222a and FET 222b, in which the currents through FET 222a and FET 222b flow into the conductor. The combined current flow through the conductor may then be magnetically sensed using the Hall effect. Thus, the subject technology may be used with any type of current sensor capable of sensing the combined current flow. By measuring the combined current flow through two wire pairs instead of individually measuring the current flow through each wire pair, the number of current sensors may be reduced.

In some aspects, when the combined current level (e.g., as indicated by the digital signal from the current sensing circuit 340) exceeds the first current threshold $I_{CUT}$, a first timer in the current management circuit 350 may start counting up a count value (e.g., from zero). The first timer may count up while the combined current level exceeds the first current threshold $I_{CUT}$. When the count value reaches a first time threshold $T_{OUT}$ (e.g., 50 ms), the current management circuit 350 may turn off FET 222a and FET 222b to shut off current flow through the second and fourth wire pairs 235a and 235b. Thus, the current management circuit 350 may allow the combined current level to exceed the first current threshold $I_{CUT}$ until the count value reaches the first time threshold $T_{CUT}$. This enables the PSE 308 to tolerate a momentary current overload before shutting off FET 222a and FET 222b.

In some aspects, when the combined current level (e.g., as indicated by the voltage drop across the current-sensing resistor R) exceeds the second current threshold $I_{LIM}$, the current management circuit 350 may operate in a current limiting mode to limit the combined current level to the second current threshold $I_{LIM}$. In the current limiting mode, the current management circuit 350 may actively adjust the gate voltages of FET 222a and FET 222b to keep the combined current level limited to the second current threshold $I_{LIM}$. In some implementations, when the combined current level rises above the second current threshold $I_{LIM}$, the current management circuit 350 may reduce the gate voltages of FET 222a and FET 222b to reduce the combined current level to the second current threshold $I_{LIM}$. When the combined current level drops below the second current threshold $I_{LIM}$, the current management circuit 350 may cease operating in the current limiting mode.

In some aspects, when the current management circuit 350 operates in the current limiting mode, a second timer in the current management circuit 350 may start counting up a count value (e.g., from zero). The second timer may count up while the current management circuit 350 operates in the current limiting mode. When the count value reaches a second time threshold $T_{LIM}$, the current management circuit 350 may turn off FET 222a and FET 222b to shut off current flow through the second and fourth wire pairs 235a and 235b. Thus, if the current management circuit 350 is in current limiting mode for too long, FET 322a and FET 322b are shut off.

The current management circuit 350 may set the first and second current thresholds $I_{CUT}$ and $I_{LIM}$ based on a detected class of the PD 202, the type of wires in the Ethernet cable 205, and/or other factors.

Figure 4:
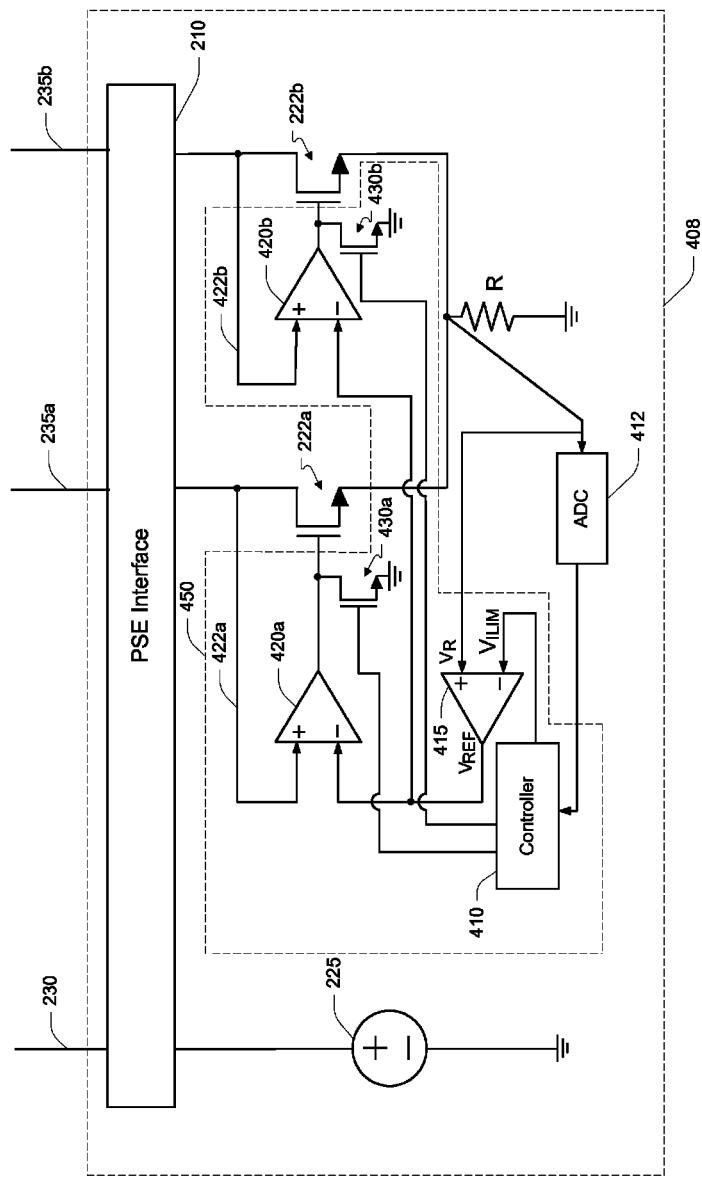
FIG. 4 illustrates an example PoE system according to some aspects of the subject technology.

FIG. 4 illustrates an example PSE 408 according to some aspects of the subject technology. The PSE 408 includes a current management circuit 450 and an analog-to-digital (ADC) channel 412. The current management circuit 450 includes a first operational amplifier (OPA) 415, a second OPA 420a, a third OPA 420b, a first switch 430a, a second switch 430b, and a controller 410.

The first switch 430a is coupled between the gate of FET 222a and ground. The controller 410 drives the first switch 430a to selectively shut off FET 222a. In some implementations, the controller 410 shuts off FET 222a by closing the first switch 430a. Closing the first switch 430a pulls the gate of the FET 222a to ground, thereby shutting off FET 222a. The controller 410 may allow FET 222a to turn on by opening the first switch 430a. In the example in FIG. 4, the first switch 430a is implemented using an N-type FET switch having a drain coupled to the gate of FET 222a, a gate coupled to the controller 410, and a source coupled to ground. In this example, the controller 410 may open the FET switch by applying a voltage below the threshold voltage of the FET switch to the gate of the FET switch, and close the FET switch by applying a voltage above the threshold voltage to the gate of the FET switch.

The second switch 430b is coupled between the gate of FET 222b and ground. The controller 410 drives the second switch 430b to selectively shut off FET 222b. In some implementations, the controller 410 may shut off FET 222b by closing the second switch 430b. The controller 410 may allow FET 222b to turn on by opening the second switch 430b. In the example in FIG. 4, the second switch 430b is implemented using an N-type FET switch.

The ADC channel 412 is configured to convert the voltage drop $V_R$ across the current-sensing resistor R into a digital signal indicating the combined current level of the second and fourth wire pairs 235a and 235b, and input the digital signal to the controller 410. The controller 410 may perform one or more current management functions based on the digital signal.

In some implementations, the controller 410 may compare the combined current level, as indicated by the digital signal from the ADC channel 412, with the first current threshold $I_{CUT}$ (e.g., 1200 mA). When the combined current level exceeds the first current threshold $I_{CUT}$, the controller 410 may start the first timer. When the count value of the first timer reaches the first time threshold $T_{CUT}$, the controller 410 may turn off FET 222a and FET 222b by closing the first switch 430a and the second switch 430b to shut off current flow through the second and fourth wire pairs 235a and 235b, respectively. This may be done to prevent overheating of the second and fourth wire pairs 235a and 235b.

The first OPA 415 has a positive input (non-inverting input) coupled to the current-sensing resistor R and a negative input (inverting input) coupled to the controller 410. The voltage drop $V_R$ across the current-sensing resistor R is input to the positive input of the first OPA 415, and a threshold voltage $V_{LIM}$ is input to the negative input of the first OPA 415 by the controller 315. The threshold voltage $V_{LIM}$ may be equal to $R*I_{LIM}$. Thus, the threshold voltage $V_{LIM}$ may equal the voltage drop across the resistor R when the current through the resistor R is equal to the second current threshold $I_{LIM}$. The first OPA 415 may output a voltage reference $V_{REF}$ based on the difference between voltages $V_R$ and $V_{LIM}$.

The second OPA 420a has a positive input (non-inverting input) coupled to the drain of FET 222a, a negative input (inverting input) coupled to the output of the first OPA 415, and an output coupled to the gate of FET 222a. The third OPA 420b has a positive input (non-inverting input) coupled to the drain of FET 222b, a negative input (inverting input) coupled to the output of the first OPA 415, and an output coupled to the gate of FET 222b.

Operation of the first OPA 415, the second OPA 420a, and the third OPA 420b will now be described for the case where the current through the current-sensing resistor R is below the second current threshold $I_{LIM}$. In this case, the voltage drop $V_R$ across the resistor R is below the threshold voltage $V_{LIM}$. As a result, the voltage difference between the positive and negative inputs of the first OPA 415 is negative, causing the first OPA 415 to reduce the voltage reference $V_{REF}$ to approximately ground.

At the second OPA 420a, the drain voltage of FET 222a is input to the positive input of the second OPA 420a and the voltage reference $V_{REF}$ (which is approximately ground) is input to the negative input of the second OPA 420a. The drain voltage of FET 222a is equal to the sum of the drain-to-source voltage of FET 222a, and the voltage drop $V_R$ across resistor R. As a result, the drain voltage of FET 222a is higher than the voltage reference $V_{REF}$ (which is approximately ground). Because an OPA typically has high gain, this causes the OPA 420a to output a high voltage to the gate of FET 222a. The high voltage may be equal to the maximum output voltage of the second OPA 420a (e.g., a voltage approximately equal to the power supply voltage of the second OPA 420a). The high voltage may fully turn on FET 222a, resulting in a low resistance across FET 222a, and therefore a small drain-to-source voltage across FET 222a. In the disclosure, FET 222a may be considered fully turned on when the voltage applied to the gate of FET 222a is approximately equal to the maximum output voltage of the second OPA 420a.

At the third OPA 420b, the drain voltage of FET 222b is input to the positive input of the third OPA 420b and the voltage reference $V_{REF}$ (which is approximately ground) is input to the negative input of the third OPA 420b. The drain voltage of FET 222b is equal to the sum of the drain-to-source voltage of FET 222b, and the voltage drop $V_R$ across resistor R. As a result, the drain voltage of FET 222b is higher than the voltage reference $V_{REF}$ (which is approximately ground). This causes the third OPA 420b to output a high voltage to the gate of FET 222b. The high voltage may be equal to the maximum output voltage of the third OPA 420b (e.g., a voltage approximately equal to the positive power supply voltage of the third OPA 420b). The high voltage may fully turn on FET 222b, resulting in a low resistance across FET 222b, and therefore a small drain-to-source voltage across FET 222b. In the disclosure, FET 222b may be considered fully turned on when the voltage applied to the gate of FET 222b is approximately equal to the maximum output voltage of the third OPA 420b.

Thus, FET 222a and FET 222b may be fully turned on by the second OPA 420a and the third OPA 420b, respectively, when the combined current level is below the second current threshold $I_{LIM}$. As a result, FET 222a and FET 222b have high conductance, enabling each of FET 222a and FET 222b to pass currents below $I_{LIM}/2$.

The drain voltage of FET 222a is equal to the sum of the drain-to-source voltage of FET 222a and the voltage drop $V_R$ across the resistor R, and the drain voltage of FET 222b is equal to the sum of the drain-to-source voltage of FET 222b and the voltage drop $V_R$ across the resistor R. Assuming that the drain-to-source voltages of FET 222a and FET 222b are approximately equal when FET 222a and FET 222b are both fully turned on, then the drain voltages of FET 222a and FET 222b are approximately equal. As a result, the current flows through the second and fourth wire pairs 235a and 235b are approximately equal, providing current balancing.

Operation of the first OPA 415, the second OPA 420a, and the third OPA 420b will now be described for the case where the current through the current-sensing resistor R is above the second current threshold $I_{LIM}$. In this case, the voltage drop $V_R$ across the resistor R is above the threshold voltage $V_{LIM}$. As a result, the voltage difference between the positive and negative inputs of the first OPA 415 is positive, causing the first OPA 415 to increase the voltage reference $V_{REF}$. The larger the difference between the voltage drop $V_R$ across the resistor R and the threshold voltage $V_{LIM}$, the larger the increase in the voltage reference $V_{REF}$.

At the second OPA 420a, the increase in the reference voltage $V_{REF}$ reduces the voltage between the positive input and negative input of the second OPA 420a. This causes the second OPA 420a to reduce the output voltage to the gate of FET 222a, thereby reducing the gate voltage of FET 222a. The reduction in the gate voltage FET 222a increases the resistance of FET 222a, thereby increasing the drain voltage of FET 222a. The increase in the drain voltage of FET 222a reduces the current through the second wire pair 235a.

At the third OPA 420b, the increase in the reference voltage $V_{REF}$ reduces the voltage between the positive input and negative input of the third OPA 420b. This causes the third OPA 420b to reduce the output voltage to the gate of FET 222b, thereby reducing the gate voltage of FET 222b. The reduction in the gate voltage FET 222b increases the resistance of FET 222b, thereby increasing the drain voltage of FET 222b. The increase in the drain voltage of FET 222b reduces the current through the fourth wire pair 235b.

Thus, when the combined current is above the second current threshold $I_{LIM}$, the first OPA 415 responds by increasing the reference voltage $V_{REF}$, which causes the second OPA 420a and the third OPA 420b to increase the drain voltages of FET 222a and FET 222b, thereby reducing the combined current through the resistor R. The first OPA 415 may increase the reference voltage $V_{REF}$ until the voltage drop $V_R$ across the resistor R drops to a voltage approximately equal to the threshold voltage $V_{LIM}$, thereby limiting the combined current to the second current threshold $I_{LIM}$.

At the second OPA 420a, the path 422a between the drain of FET 222a and the positive input of the second OPA 420a forms a control loop. The control loop causes the second OPA 420a to adjust the gate voltage of FET 222a in a direction that reduces the voltage different between the drain voltage of FET 222a and the reference voltage $V_{REF}$. When the reference voltage $V_{REF}$ is above the voltage drop $V_R$ across the resistor R, the control loop may force the drain voltage of FET 222a to be approximately equal to the reference voltage $V_{REF}$.

At the third OPA 420b, the path 422b between the drain of FET 222b and the positive input of the third OPA 420b forms a control loop. The control loop causes the third OPA 420b to adjust the gate voltage of FET 222b in a direction that reduces the voltage different between the drain voltage of FET 222b and the reference voltage $V_{REF}$. When the reference voltage $V_{REF}$ is above the voltage drop $V_R$ across the resistor R, the control loop may force the drain voltage of FET 222b to be approximately equal to the reference voltage $V_{REF}$.

Thus, the second OPA 420a and the third OPA 420b may independently adjust the gate voltages of FET 222a and FET 222b, respectively, such that the drain voltages of FET 222a and FET 222b are approximately equal to the reference voltage $V_{REF}$, and therefore approximately equal to each other. Because the drain voltages of FET 222a and FET 222b are approximately equal, the current flows through the second and fourth wire pairs 235a and 235b are approximately equal. Thus, the second OPA 420a and the third OPA 420b make the drain voltages of FET 222a and FET 222b approximately equal to each other by making the drain voltages of FET 222a and FET 222b approximately equal to a common voltage (e.g., the reference voltage $V_{REF}$).

In some aspects, the controller 410 may monitor the duration that the current management circuit 450 is in the current limiting mode. In some implementations, the controller 410 may determine that the current management circuit 450 is in the current limiting mode when the combined current level (e.g., as indicated by the digital signal from the ADC channel 412) is approximately equal to or exceeds the second current threshold $I_{LIM}$. When the controller 410 determines that the current management circuit 450 is operating in the current limiting mode, the controller 410 may start the second timer. The controller 410 may allow the second timer to count up a count value while the current management circuit 450 operates in the current limiting mode. When the count value reaches the second time threshold $T_{LIM}$, the controller 410 may close the first switch 430a and the second switch 430b to shut off FET 222a and FET 222b, respectively. This may be done to prevent the current management circuit 450 from operating in the current limiting mode for too long.

Figure 5:
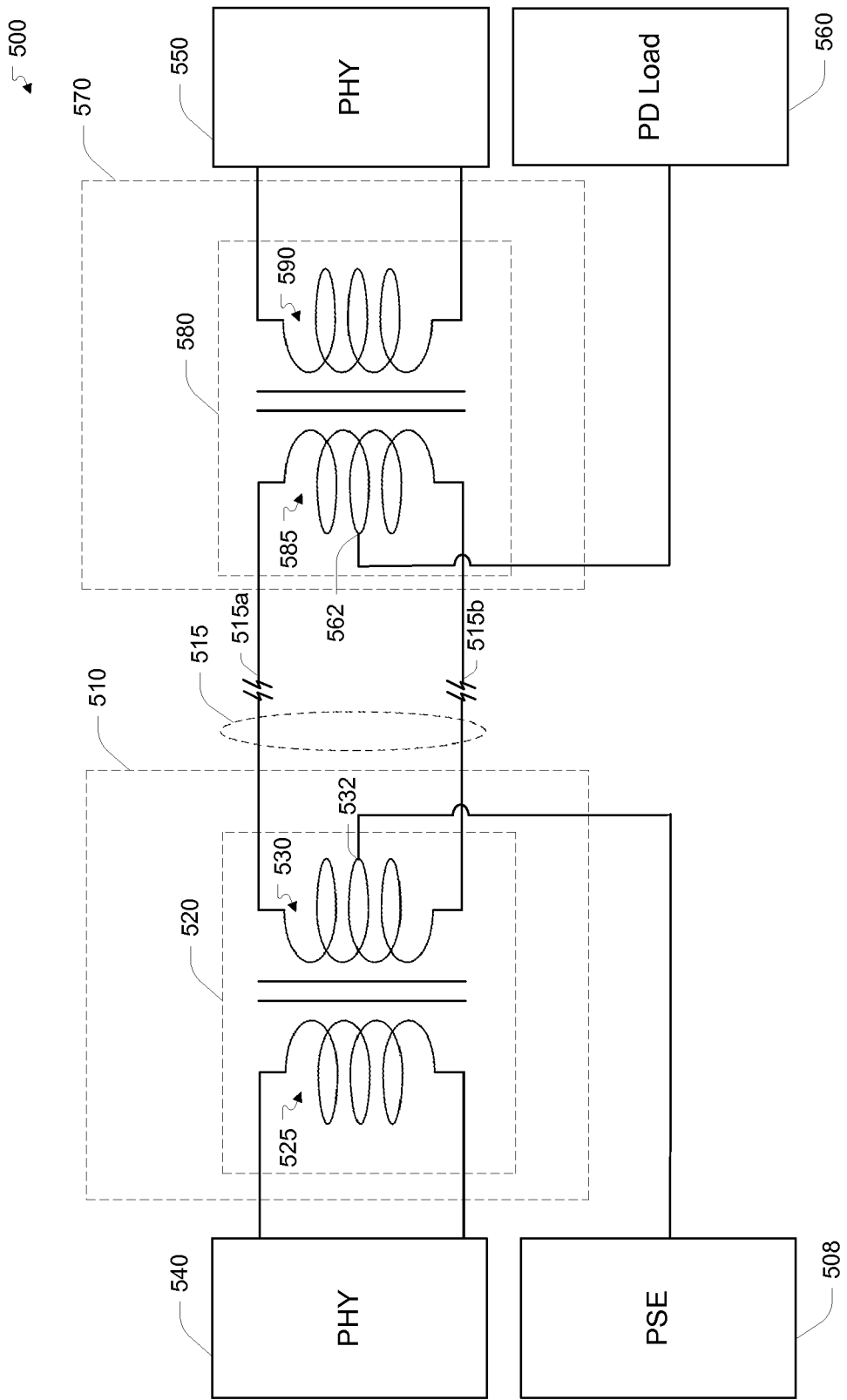
FIG. 5 illustrates an example interface that couples a data signal and a power signal to a pair of wires of an Ethernet cable.

In some implementations, data may be sent on the Ethernet cable 205 simultaneously with power. In this regard, FIG. 5 shows an example system 500 for providing data and power on any one of the wire pairs 515 of the Ethernet cable 205. The wire pair 515 may be a pair of wires 515a and 515b, and may be any one of the wire pairs 230, 235a and 235b shown in FIGS. 3 and 4. The system 500 includes a data/PSE interface 510, a physical layer (PHY) circuit 540, and a PSE 508. The PSE 508 may be implemented using any one of the PSEs 308 and 408 in FIGS. 3 and 4.

The data/PSE interface 510 includes a transformer 520. The transformer 520 includes a first winding 525 coupled to the PHY circuit 540, and a second winding 530 coupled to the wire pair 515. The second winding 530 may be coupled to the wire pair 515 using an RJ-45 connector (not shown) or other type of connector. The transformer 520 inductively couples a data signal from the PHY circuit 540 to the wire pair 515 and/or inductively couples a digital signal from the wire pair 515 to the PHY circuit 540. Thus, the transformer enables the PHY circuit 540 to transmit a data signal to the wire pair 515 and/or receive a data signal from the wire pair 515.

The PSE 508 is coupled to a center tap 532 of the second winding 530 of the transformer 520. This enables the PSE 508 to receive a power signal from the wire pair 515 and/or transmit a power signal to the wire pair 515. In some implementations, the PSE 508 may receive a current of a power signal from the wire pair 515 via the center tap 532 of the second winding 530, and direct the current to FET 222a or FET 222b for power control. Alternatively, the PSE 508 may direct power from the voltage source 225 to the wire pair 515 via the center tap 532.

In some implementations, the data/PSE interface 510 may include two transformers, where one of the transformers is used to couple a data signal from the PHY circuit 540 to one of the wire pairs of the Ethernet cable 205 for transmission to the PD 202 and the other transformer is used to couple a data signal from another one of the wire pairs of the Ethernet cable 205 to the PHY circuit 540. The PSE 508 may be coupled to both wire pairs via center taps on the respective transformers. For each wire pair, the PSE 508 may transmit power from the voltage source 225 to the wire pair and/or receive a current of a power signal from the wire pair and direct the current to FET 222a or FET 222b.

In some implementations, one or more of the wire pairs of the Ethernet cable 205 may only be used for power delivery. When a wire pair is only used for power delivery, the PSE 508 may be coupled to the wire pair without using a transformer.

The system 500 also includes a data/PD interface 570, a physical layer (PHY) circuit 550, and a PD load 560. The PD load 560 may be the PD load 220 in FIG. 3. The data/PD interface 570 includes a transformer 580. The transformer 580 includes a first winding 585 coupled to the wire pair 515 and a second winding 590 coupled to the PHY circuit 550. The transformer 580 inductively couples a data signal from the PHY circuit 550 to the wire pair 515 and/or inductively couples a digital signal from the wire pair 515 to the PHY circuit 550. Thus, the transformer 580 enables the PHY circuit 550 to transmit a data signal to the wire pair 515 and/or receive a data signal from the wire pair 515.

The PD load 560 is coupled to a center tap 562 of the first winding 585 of the transformer 580. This enables the PD load 560 to receive power from the PSE over the wire pair 515. In some implementations, the PD load 560 may include a load from the PHY circuit 550 and/or a load from other components of the PD that receive power from the PSE.

Figure 6:
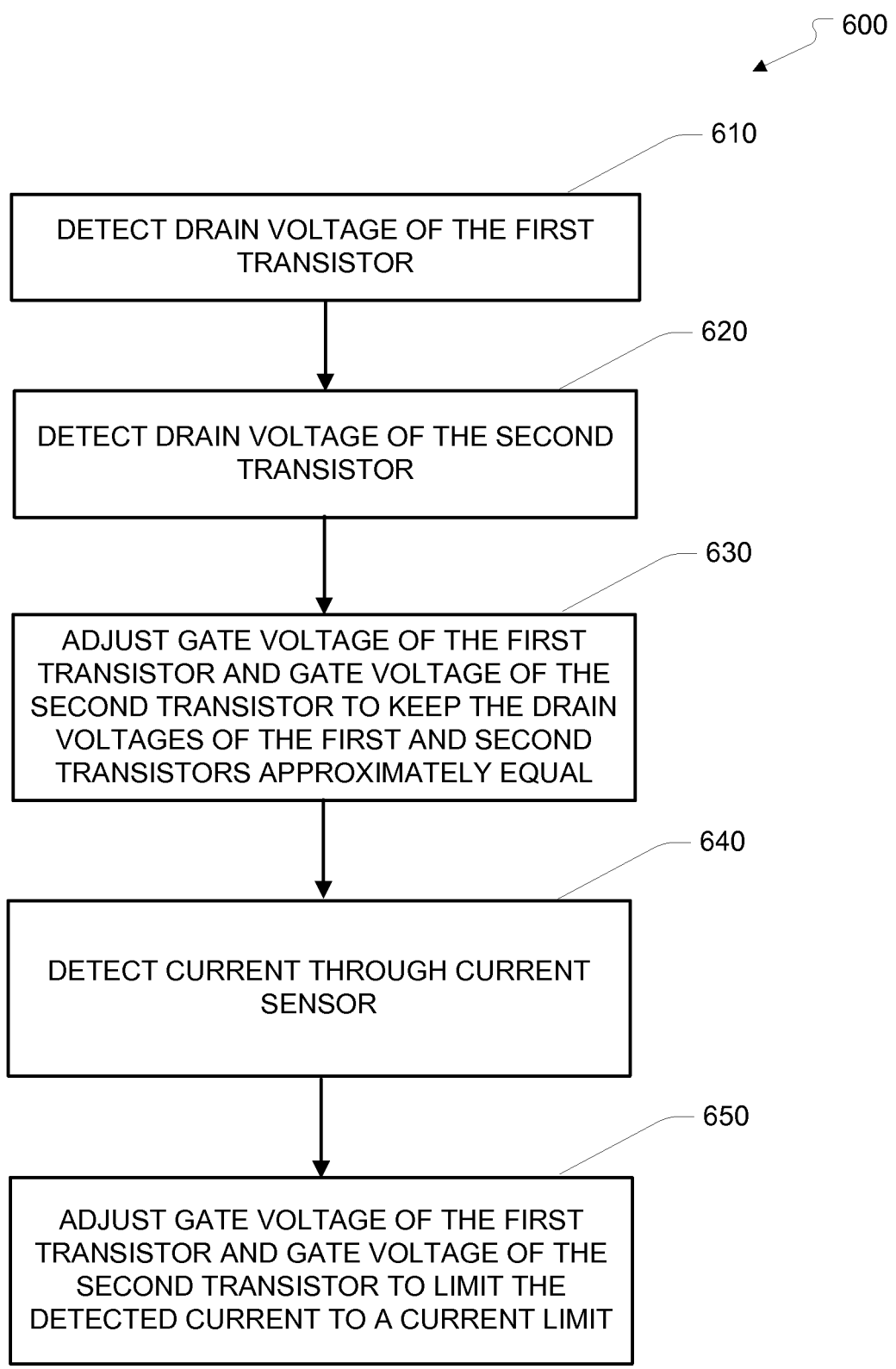
FIG. 6 is a flow diagram of an example method of power control according to aspects of the subject technology.

FIG. 6 is a flow diagram illustrating an example method 600 of power control according to aspects of the subject technology. The method 600 may be performed in a system including a first transistor having a drain coupled to a first conductor (e.g., first pair of wires) and a source coupled to a current sensor, and a second transistor having a drain coupled to a second conductor (e.g., a second pair of wires) and a source coupled to the current sensor. The conductors may be used to receive return current from a PD. The current sensor may be a current-sensing resistor, a Hall-effect current sensor, or another type of current sensor.

A drain voltage of the first transistor is detected (610), and a drain voltage of the second transistor is detected (620). The drain voltages of the first and second transistors may be detected simultaneously. A gate voltage of the first transistor and a gate voltage of the second transistor are adjusted to keep the detected drain voltages of the first and the second transistors approximately equal (630).

A current through the current sensor is detected (640). The gate voltage of the first transistor and the gate voltage of the second transistor are adjusted to limit the detected current to a current limit (650). The gate voltage of the first transistor and the gate voltage of the second transistor may be adjusted simultaneously to keep the detected drain voltages of the first and the second transistors approximately equal (620) and to limit the detected current to the current limit (650).

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry.

Some implementations can include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Some implementations can be performed by a microprocessor or multi-core processors that execute software. Some implementations can be performed by one or more integrated circuits, such as application specific integrated circuits (ASICs) or field programmable gate arrays (FPGAs). In some implementations, such integrated circuits can execute instructions that are stored on the circuit itself.

Many of the above-described features and applications may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:
1. A power control system, comprising:
a first transistor;
a second transistor;

an interface configured to couple a drain of the first transistor to a first conductor, and to couple a drain of the second transistor to a second conductor;
a current sensor coupled to a source of the first transistor and a source of the second transistor; and
a current management circuit comprising a first comparator, and a second comparator, wherein:
the first comparator is configured to detect a drain voltage of the first transistor,
the second comparator is configured to detect a drain voltage of the second transistor,
the first and the second comparators are further configured to adjust a gate voltage of the first transistor and a gate voltage of the second transistor to keep the detected drain voltages of the first and the second transistors approximately equal by comparing the drain voltage of the first transistor and the drain voltage of the second transistor to a reference voltage.

2. The power control system of claim 1, wherein the current sensor comprises a current-sensing resistor, and wherein the current management circuit further comprises a controller configured to adjust the gate voltage of the first transistor and the gate voltage of the second transistor to limit a detected current through the current sensor to a current limit by controlling switches coupled to gates of the first and second transistors.

3. The power control system of claim 1, wherein the first conductor comprises a first pair of wires of an Ethernet cable, and the second conductor comprises a second pair of wires of the Ethernet cable.

4. The power control system of claim 1, wherein the current management circuit is further configured to compare a detected current through the current sensor to a current threshold, and, when the detected current exceeds the current threshold for a time period, to shut off the first transistor and the second transistor.

5. The power control system of claim 4, further comprising:
a first switch coupled between a gate of the first transistor and a ground; and
a second switch coupled between a gate of the second transistor and the ground;
wherein the current management circuit is configured to shut off the first transistor and the second transistor by closing the first switch and the second switch, respectively.

6. The power control system of claim 1, wherein the current management circuit is configured to limit a detected current through the current sensor to a current limit by comparing the detected current to a current limit threshold, and, when the detected current exceeds the current limit threshold, reducing the gate voltage of the first transistor and the gate voltage of the second transistor.

7. The power control system of claim 1, wherein the current management circuit is configured to keep the detected drain voltages of the first and the second transistors approximately equal by adjusting the gate voltage of the first transistor to reduce a difference between the drain voltage of the first transistor and the reference voltage, and adjusting the gate voltage of the second transistor to reduce a difference between the drain voltage of the second transistor and the reference voltage.

8. The power control system of claim 7, wherein the current management circuit is configured to limit a detected current through the current sensor to a current limit by increasing the reference voltage when the detected current exceeds a current limit threshold.

9. A method for power control, comprising:
detecting a drain voltage of a first transistor having a drain coupled to a first conductor and a source coupled to a current sensor;
detecting a drain voltage of a second transistor having a drain coupled to a second conductor and a source coupled to the current sensor;
adjusting a gate voltage of the first transistor and a gate voltage of the second transistor to keep the detected drain voltages of the first and the second transistors approximately equal by comparing the detected drain voltages of the first and the second transistors to a reference voltage;
detecting a current through the current sensor; and
adjusting the gate voltage of the first transistor and the gate voltage of the second transistor to limit the detected current to a current limit by controlling switches coupled to gates of the first and second transistors.

10. The method of claim 9, wherein the current sensor comprises a current-sensing resistor.

11. The method of claim 9, wherein the first conductor comprises a first pair of wires of an Ethernet cable, and the second conductor comprises a second pair of wires of the Ethernet cable.

12. The method of claim 9, further comprising:
comparing the detected current to a current threshold; and
when the detected current exceeds the current threshold for a time period, shutting off the first transistor and the second transistor.

13. The method of claim 12, wherein shutting off the first transistor and the second transistor comprises:
closing a first switch coupled between a gate of the first transistor and a ground; and
closing a second switch coupled between a gate of the second transistor and the ground.

14. The method of claim 9, wherein adjusting the gate voltage of the first transistor and the gate voltage of the second transistor to limit the detected current to the current limit comprises:
comparing the detected current to a current limit threshold; and
when the detected current exceeds the current limit threshold, reducing the gate voltage of the first transistor and the gate voltage of the second transistor.

15. The method of claim 9, wherein adjusting the gate voltage of the first transistor and the gate voltage of the second transistor to keep the detected drain voltages of the first and the second transistors approximately equal comprises:
adjusting the gate voltage of the first transistor to reduce a difference between the drain voltage of the first transistor and the reference voltage; and
adjusting the gate voltage of the second transistor to reduce a difference between the drain voltage of the second transistor and the reference voltage.

16. The method of claim 15, wherein adjusting the gate voltage of the first transistor and the gate voltage of the second transistor to limit the detected current to a current limit comprises increasing the reference voltage when the detected current exceeds a current limit threshold.

17. A power source equipment (PSE), comprising:
a power source;
a first transistor;
a second transistor;
an interface configured to couple a drain of the first transistor to a first pair of wires of an Ethernet cable, to couple a drain of the second transistor to a second pair of wires of the Ethernet cable, and to couple the power source to a third pair of wires of the Ethernet cable;

a current sensor coupled to a source of the first transistor and a source of the second transistor; and a current management circuit comprising a first comparator, and a second comparator, wherein:

the first comparator is configured to detect a drain voltage of the first transistor, the second comparator is configured to detect a drain voltage of the second transistor, the first and the second comparators are further configured to adjust a gate voltage of the first transistor and a gate voltage of the second transistor to keep the detected drain voltages of the first and the second transistors approximately equal by comparing the drain voltage of the first transistor and the drain voltage of the second transistor to a reference voltage.

18. The PSE of claim 17, wherein the current sensor comprises a current-sensing resistor, and wherein the current management circuit further comprises a controller configured to adjust the gate voltage of the first transistor and the gate voltage of the second transistor to limit a current through the current sensor to a current limit by controlling switches coupled to gates of the first and second transistors.

19. The PSE of claim 17, wherein the interface is configured to couple the power source to a fourth pair of wires of the Ethernet cable in parallel with the third pair of wires of the Ethernet cable.

20. The PSE of claim 17, wherein the current management circuit is configured to keep the detected drain voltages of the first and the second transistors approximately equal by adjusting the gate voltage of the first transistor to reduce a difference between the drain voltage of the first transistor and the reference voltage, and adjusting the gate voltage of the second transistor to reduce a difference between the drain voltage of the second transistor and the reference voltage.

21. The PSE of claim 20, wherein the current management circuit is configured to limit a detected current through the current sensor to a current limit by increasing the reference voltage when the detected current exceeds a current limit threshold.

* * * * *